(12) United States Patent
Fleming

(10) Patent No.: US 7,400,293 B2
(45) Date of Patent: Jul. 15, 2008

(54) ATMOSPHERIC TURBULENCE ANALYSIS SYSTEM

(75) Inventor: Rex J. Fleming, Boulder, CO (US)

(73) Assignee: Global Aerospace, LLC, Boulder, CO (US)

(*) Notice: Subject to any disclaimer, the term of this patent is extended or adjusted under 35 U.S.C. 154(b) by 0 days.

(21) Appl. No.: 11/604,001

(22) Filed: Nov. 21, 2006

(65) Prior Publication Data

US 2007/0159383 A1    Jul. 12, 2007

Related U.S. Application Data

(60) Provisional application No. 60/758,331, filed on Jan. 12, 2006.

(51) Int. Cl.
*G01S 1/00* (2006.01)

(52) U.S. Cl. .................... 342/357.02; 342/357.06

(58) Field of Classification Search ............ 342/357.01, 342/357.02, 357.06, 357.12; 701/3, 10, 213
See application file for complete search history.

(56) References Cited

U.S. PATENT DOCUMENTS

| | | | |
|---|---|---|---|
| 4,015,257 A | 3/1977 | Fetter | |
| 4,397,549 A | 8/1983 | Morgan | |
| 4,761,650 A | 8/1988 | Masuda et al. | |
| 4,937,447 A | 6/1990 | Barrett | |
| 5,117,689 A | 6/1992 | Gary | |
| 5,534,868 A | 7/1996 | Gjessing et al. | |
| 5,541,591 A | 7/1996 | Bush | |
| 5,568,151 A | 10/1996 | Merritt | |
| 5,654,700 A | 8/1997 | Prata et al. | |
| 5,940,035 A * | 8/1999 | Hedrick | 342/462 |
| 5,974,875 A | 11/1999 | Leslie et al. | |
| 6,000,285 A | 12/1999 | Leslie et al. | |
| 6,070,460 A | 6/2000 | Leslie et al. | |
| 6,070,461 A | 6/2000 | Gjessing et al. | |
| 6,184,816 B1 | 2/2001 | Zheng et al. | |
| 6,237,405 B1 | 5/2001 | Leslie | |
| 6,480,142 B1 | 11/2002 | Rubin | |
| 6,531,967 B2 | 3/2003 | Djorup | |
| 6,590,520 B1 | 7/2003 | Steele et al. | |
| 6,738,010 B2 | 5/2004 | Steele et al. | |
| 2002/0079425 A1* | 6/2002 | Rhoads | 250/201.9 |
| 2004/0167709 A1* | 8/2004 | Smitherman et al. | 701/208 |

OTHER PUBLICATIONS

C. Rocken, et al.; Analysis and Validation of GPS/MET Data in the Neutral Atmosphere; Journal of Geophysical Research; Dec. 27, 1997; pp. 29,849-29,866; vol. 102, No. D25; American Geophysical Union.

Alexander E. MacDonald, et al.; Diagnosis of Three-Dimensional Water Vapor Using a GPS Network; Jan. 3, 2001; pp. 1-43; Forecast Systems Laboratory, NOAA/OAR; Boulder, Colorado.

(Continued)

*Primary Examiner*—Dao L Phan
(74) *Attorney, Agent, or Firm*—Setter Roche LLP

(57) ABSTRACT

A turbulence analysis system comprises a communication interface and a processing system. The communication interface receives time variance metrics for a plurality of satellite signals. The time variance metrics correspond to variances in signal transfer times for individual satellite signals. The processing system determines position metrics for the individual satellite signals. The position metrics correspond to geometric signal paths in a three-dimensional area for the individual satellite signals. The processing system processes the position metrics and the time variance metrics for the satellite signals to allocate atmospheric turbulence values to the three-dimensional area to produce an atmospheric turbulence map indicating the atmospheric turbulence values in the three dimensional area. The communication interface transfers the atmospheric turbulence map.

20 Claims, 6 Drawing Sheets

OTHER PUBLICATIONS

Rex J. Fleming; Limitations on GPS Slant Path Water Vapor Analysis and Ways to Improve the Application; Nov. 17, 2001; 9 pages; University Corporation for Atmospheric Research.

Michael Bevis, et al.; GPS Meteorology: Remote Sensing of Atmospheric Water Vapor Using the Global Positioning System; Mar. 20, 1992; 37 pages; JGR-Atmospheres.

William H. Press, et al.; Numerical Recipes, The Art of Scientific Computing; 1986; pp. 52-59, 307-311, 515-519; Press Syndicate of the University of Cambridge; Cambridge, United Kingdom.

Frank Kleijer, et al., "Characterizing Atmospheric Turbulence with GPS," 2004, pp. 1-7, Harvard-Smithsonian Center for Astrophysics, Cambridge, Massachusetts.

Larry Cornman, et al., "The Effect of Turbulence on GPS Signals: Theory and Measurements," Jul. 2004, 34 pages, National Center for Atmospheric Research, U.S.A.

Larry B. Corman, et al., "The Detection of Upper Level Turbulence Via GPS Occultation Methods," 2004, pp. 1-10, National Center for Atmospheric Research, Boulder, Colorado.

* cited by examiner

ATMOSPHERIC TURBULENCE ANALYSIS SYSTEM

RELATED CASES

This patent application claims the benefit of U.S. provisional patent application 60/758,331; filed on Jan. 12, 2006; and entitled "ATMOSPHERIC TURBULENCE ANALYSIS SYSTEM AND METHOD;" and which is hereby incorporated by reference into this patent application.

BACKGROUND OF THE INVENTION

1. Field of the Invention

The invention is related to the field of atmospheric turbulence, and in particular, to systems and methods to detect and display atmospheric turbulence.

2. Statement of the Problem

The use of Global Position System (GPS) satellite signals for location determination is well known. Environmental conditions affect GPS signals, and thus, GPS signals have also been processed to monitor environmental conditions. For example, GPS signals have been processed to monitor temperature, wind, and water vapor in the atmosphere. Changes in the index of refraction or refractivity as the GPS signal passes through the atmosphere are a function of the temperature and water vapor content along the GPS signal path. Most meteorological applications of GPS technology seek to separate the temperature and water vapor effects. Some attempts have been made to process GPS signals to assess atmospheric turbulence. As discussed below, these attempts have failed to produce an effective system to process GPS signals to produce a three-dimensional map of atmospheric turbulence.

One technique for processing GPS signal to monitor atmospheric turbulence is described in *Characterizing Atmospheric Turbulence with GPS* by F. Kleijer, P. Elosegue, and J. L. Davis (1994). This technique postulates that the tropospheric delay caused by turbulence to be the zero-mean difference between the actual slant path delay and a mapped zenith delay. The turbulence strength factor obtained from a single GPS receiver site at Mount Washington, N.H. shows temporal variations that could be related to turbulence strength. However, there is no indication of the location of the turbulence as a function of height. The fundamental concern of the technique is that the data is a measure of the index of refraction fluctuations which consist of water vapor variations and gradients of water vapor mixed in with turbulence information. Clear air turbulence, primarily related to velocity gradients and has not been identified with water vapor fluctuations. The problem with this technique is that water vapor change is mixed in with the data. There can be heterogeneous variability of water vapor without any turbulence. The technique does not mention how a final four dimensional mapping in space and time of the dynamic atmospheric turbulence field can be achieved.

Another technique for processing GPS signals to monitor atmospheric turbulence is described in *The Effect of Turbulence of GPS Signals: Theory and Measurement* by L. Cornman and R. Frelich (July 2004). This technique recognizes that GPS data received at the ground can be characterized by strong humidity variations in the boundary layer, making it difficult to separate out fluctuations due to humidity and temperature fluctuations. This technique chooses to use GPS-LEO occultation data (data gathered in a vertical column) to get vertical information about atmospheric turbulent structures above the boundary layer. The technique uses GPS amplitude and phase data, removes the mean atmospheric effects (e.g., from a high resolution atmospheric model), then performs a Fourier spectrum analysis of selected time intervals of the occultation profile to get amplitude and phase spectra. The technique seems to produce reasonable agreement between the measured and modeled spectra. The technique deliberately sets out to use fluctuations of GPS signals passing through the upper regions of the atmosphere that are mainly influenced by temperature-induced turbulence—not water vapor. The limitation of the technique is that the relevant equation has three unknowns: $L0$ the length scale of the turbulence, $C2$ the turbulence intensity, and $\Delta\eta$ the thickness of the vertical patch of turbulence. The length scale was assumed to be 3000 m a priori, and the combined two variables $[C2\Delta\eta]$ are found by a single variable maximum likelihood fit. The problem is that $\Delta\eta$ can vary greatly (and with a single occultation $\Delta\eta$ cannot be determined) so that the intensity cannot be known for sure. The technique suggests that if many occultations (vertical profiles) through the same region of space were available, tomographic methods could be used. One could add occulatations (vertical profiles) from commercial aircraft with GPS receivers. However, the lower aircraft occultations would be influenced by water vapor—the very problem the statistical approximations and scattering theory used in the approach were trying to avoid. A far bigger problem is that the number of occultations per unit area would not be sufficient for convergence and removal of the ambiguity between the three unknowns listed above.

Another technique, described in U.S. Pat. No. 6,738,010, looked at signals transmitted from aircraft near the airport to assess turbulence near the airport. This technique measured phase change of the transmitted signals helped to identify turbulence. This technique did not use GPS signals or any other satellite signals from a system that is already deployed.

SUMMARY OF THE SOLUTION

Examples of the invention include a turbulence analysis system and its method of operation. The turbulence analysis system comprises a communication interface and a processing system. The communication interface receives time variance metrics for a plurality of satellite signals. The time variance metrics correspond to variances in signal transfer times for individual ones of the satellite signals. The processing system determines position metrics for the individual ones of the satellite signals. The position metrics correspond to geometric signal paths in a three-dimensional area for the individual ones of the satellite signals. The processing system processes the position metrics and the time variance metrics for the satellite signals to allocate atmospheric turbulence values to the three-dimensional area to produce an atmospheric turbulence map indicating the atmospheric turbulence values in the three dimensional area. The communication interface transfers the atmospheric turbulence map.

In some examples of the invention, the turbulence analysis system further comprises a plurality of airplane systems on airplanes and a plurality of ground systems that receive the satellite signals from the satellites, process the satellite signals to determine the time variance metrics for the satellite signals, and transfer the time variance metrics for the satellite signals.

In some examples of the invention, the airplane systems and the ground systems determine the time variance metrics by determining average signal transfer times during a plurality of sample periods, determining a mean signal transfer time during a variance period, wherein the variance period includes the sample periods, and determining differences between the average signal transfer times and the mean signal transfer time.

In some examples of the invention, a first set of the position metrics indicate a first set of the geometric signal paths in the three-dimensional area between the satellites and the airplanes.

In some examples of the invention, a second set of the position metrics indicate a second set of the geometric signal paths in the three-dimensional area between the satellites and the ground systems.

In some examples of the invention, the processing system processes the position metrics and the time variance metrics for the satellite signals to allocate the atmospheric turbulence values to the three-dimensional area by processing a singular value decomposition algorithm to allocate the atmospheric turbulence values to the three-dimensional area.

In some examples of the invention, the turbulence analysis system further comprises airplane systems on airplanes configured to receive and display at least a portion of the turbulence map on the airplanes.

In some examples of the invention, the processing system compares a flight plan for an airplane to the turbulence map to determine if the flight plan will traverse atmospheric turbulence, and if the flight plan will traverse the atmospheric turbulence, the processing system generates a turbulence alarm. The communication interface transfers the turbulence alarm.

In some examples of the invention, the processing system determines an alternative flight plan for the airplane that will not traverse the atmospheric turbulence, and the communication interface transfers the alternative flight plan.

In some examples of the invention, the satellites comprise Global Positioning System (GPS) satellites and the satellite signals comprise GPS signals.

DESCRIPTION OF THE DRAWING

The same reference number represents the same element on all drawings.

DETAILED DESCRIPTION OF THE INVENTION

The following description and associated figures depict specific examples of the invention to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Turbulence Analysis System

Figure 1:
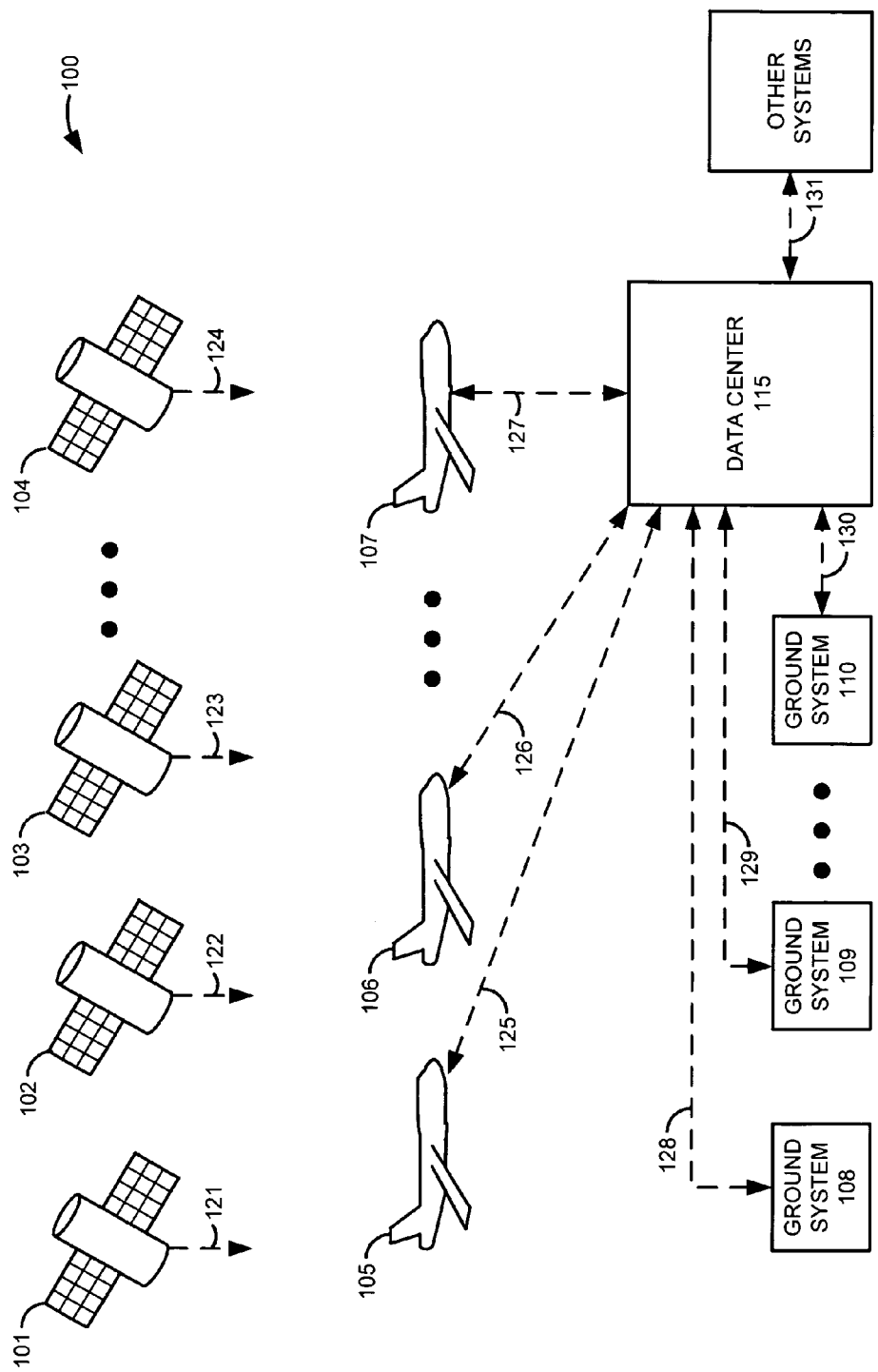
FIG. 1 illustrates a turbulence analysis system in an example of the invention.

FIG. 1 illustrates turbulence analysis system 100 in an example of the invention. Turbulence analysis system 100 includes satellites 101-104, airplanes 105-107, ground systems 108-110, and data system 115. Note that the number of elements shown on FIG. 1 has been restricted for clarity. There would typically be more satellites, airplanes, and ground systems than the number shown that operate as described herein.

Satellites 101-104 transfer respective signals 121-124 that indicate their time of transmission and transmitting satellite. Satellites 101-104 could be Global Position Satellites (GPS) that transfer GPS signals. A GPS signal also includes a Pseudo Random Noise (PRN) code that identifies its transmitting satellite. Alternatively, other satellites that transfer signals indicating their time of transmission and satellite identity could be used.

Airplanes 105-107 include airplane systems that receive and process satellite signals 121-124 to determine time variance metrics for each of the satellite signals 121-124. Ground systems 108-110 also receive and process satellite signals 121-124 to determine time variance metrics for each of the satellite signals. A time variance metric indicates the variance in the signal transfer time for an individual satellite signal between a transmitting satellite and a receiving system. This variance in signal transfer time corresponds to the level of atmospheric turbulence in the path of that satellite signal. Thus, the time variance metric corresponds to the level of atmospheric turbulence in the path of the satellite signal. This path is defined by the position of the sending satellite and the position of the receiving system. For example, the time variance metric for satellite signal 121 in between satellite 101 and airplane 105 corresponds to the level of atmospheric turbulence in between satellite 101 and airplane 105. Likewise, the time variance metric for satellite signal 121 in between satellite 101 and ground system 110 corresponds to the level of atmospheric turbulence in between satellite 101 and ground system 110.

Note that the number of satellites has been restricted for clarity. Airplane systems on airplanes 105-107 and ground systems 108-110 typically receive and process additional satellite signals from other satellites to produce additional time variance metrics. The airplane systems and ground systems typically receive different sets of the satellite signals. In addition, the set of satellite signals that a given system receives typically changes over time.

On airplanes 105-107, the airplane systems also process satellite signals 121-124 to determine the current location of airplanes 105-107 in Three Dimensional (3D) space. The airplane systems transfer data signals from airplanes 105-107 to data center 115 over respective communication links 125-127. The airplane systems periodically produce and transfer the data signals. This time period could be every few minutes, every 5-10 minutes, every 30 minutes, or some other time interval. Each of the data signals indicates its corresponding airplane system, approximate location, approximate time, and time variance metrics identified with their respective satellites 121-124. Note that communication links 125-127 could use any suitable communication technology, such as wireless systems and the Internet. One suitable system for air to ground communications is the well-known ACARS system. Communication links 125-127 may include multiple different communication systems, computer systems, and connections that are coupled together in between airplanes 105-107 and data center 115.

For example, the airplane system on airplane 105 receives and processes satellite signals 121-124 to determine the current location of airplane 105. The airplane system processes satellite signal 121 from satellite 101 to determine a first time variance metric. The airplane system processes satellite signal 122 from satellite 102 to determine a second time variance metric. The airplane system processes satellite signal 123 from satellite 103 to determine a third time variance metric. The airplane system processes satellite signal 124 from satellite 104 to determine a fourth time variance metric. The airplane system then transfers a data signal over communication link 125 to data center 115. The data signal indicates the identity of the airplane system on airplane 105, the approximate location of airplane 105, the approximate time, the first time variance metric and the identity of its associated satellite 101, the second time variance metric and the identity of its associated satellite 102, the third time variance metric and the identity of its associated satellite 103, and the fourth time variance metric and the identity of its associated satellite 104. The airplane system on airplane 105 might repeat the above process every 5-10 minutes. The airplane systems on airplanes 106-107 would operate in a similar fashion.

Ground systems 108-110 also transfer data signals to data center 115 over respective communication links 128-130. Ground systems 108-110 would periodically calculate and transfer the data signals. This time period could be every few minutes, every 5-10 minutes, every 30 minutes, or other time interval. Each of the data signals indicates the identity of the sending ground system, the approximate time, and time variance metrics identified with their respective satellites 121-124. Note that communication links 128-130 could use any suitable communication technology, such as wireless systems and the Internet. Communication links 128-130 may also include multiple different communication systems, computer systems, and connections that are coupled together in between ground systems 108-110 and data center 115.

For example, ground system 108 processes satellite signal 121 from satellite 101 to determine a first time variance metric. Ground system 108 processes satellite signal 122 from satellite 102 to determine a second time variance metric. Ground system 108 processes satellite signal 123 from satellite 103 to determine a third time variance metric. Ground system 108 processes satellite signal 124 from satellite 104 to determine a fourth time variance metric. Ground system 108 then transfers a data signal over communication link 128 to data center 115. The data signal indicates the identity of ground system 108, the approximate time, the first time variance metric and the identity of its associated satellite 101, the second time variance metric and the identity of its associated satellite 102, the third time variance metric and the identity of its associated satellite 103, and the fourth time variance metric and the identity of its associated satellite 104. Ground system 108 might repeat the above process every 5-10 minutes. Ground systems 109-110 would operate in a similar fashion.

Data center 115 receives the data signals from the systems on airplanes 105-107 and from ground systems 108-110 over communication links 125-130. Data center 115 processes the data signals and other data to determine position metrics for satellite signals 121-124. The position metrics correspond to the geometric signal paths taken by the received satellite signals 121-124. Satellite signals 121-124 are rays and the geometric signal paths are the ray paths.

Data center 115 processes the position metrics and the time variance metrics for satellite signals 121-124 to allocate atmospheric turbulence values to a three-dimensional (3D) area. The 3D area covers a surface area of interest, such as the United States or a region of the United States. The 3D area extends from the ground to an elevation of interest, such as 12 kilometers (km). The 3D area could use other surface areas and elevations. The 3D area may have various resolutions. For example the 3D area may be comprised of boxes that are 10-100 km wide, 10-100 km deep, and ½ km high, although other resolutions could be used. Data system 115 transfers an atmospheric turbulence map indicating the atmospheric turbulence values in the three dimensional area.

Data center 115 would periodically repeat the above process. For example, data center 115 might produce a new turbulence map every few minutes, every 5-10 minutes, every 30 minutes, every hour, or at some other time interval. In addition, data center 115 could use various resolutions for the turbulence values. For example, turbulence values could be characterized as none, light, moderate, and severe. The 3D boxes in the turbulence map would be labeled with none, light, moderate, and severe turbulence. For example, the turbulence map could be color-coded to indicate turbulence in 3D.

Data center 115 transfers the turbulence map or relevant portions of the turbulence map to airplanes 105-107 over communication links 125-127. For example, data center 115 may transfer a portion of the turbulence map that is within 500 miles of the airplane 105's current location every 30 minutes. Thus, airplane 105 would receive a continually updated turbulence map for their area. If the turbulence map indicates turbulence in the flight path, the pilot may use the turbulence map to select an alternative flight path that avoids the turbulence.

Data center 115 obtains the flight plan for airplane 105. Data system 115 may receive the flight plan from the airplane system over communication link 125. Data system 115 may determine the flight plan based on the location supplied by the airplane system on airplane 105. Data system 115 may retrieve the flight plan from a database operated by an airline or government agency. Data system 115 compares the flight plan for airplane 105 to the turbulence map to determine if the flight plan will traverse areas of turbulence. If the flight plan will traverse an area of turbulence, data center 115 generates and transfers a turbulence alarm to airplane 105. Data center 115 may also determine alternative flight plans that avoid the areas of turbulence and indicate the alternative flight plans to airplane 105 along with the turbulence alarm.

Other systems represent computer systems for other airplanes, airline companies, airports, research entities, government agencies (such as the Air Traffic Management (ATM) authorities), the military, or some other entity. Data center 115 could supply the turbulence map or portions of the turbulence map to the other systems over communication link 131. Likewise, data center 115 could provide turbulence alarms and alternative flight plans to the other systems over communication link 131. These other systems do not need to have the airplane or ground systems described above.

The airplane systems in airplanes 105-107 could receive the turbulence map (or portions of the map) and the turbulence alarms from data center 115 over communication links 125-127. The airplane systems could display the turbulence map (or portions of the map) to airplane personnel. The airplane systems could display the turbulence alarms and alternative flight plans to airplane personnel. The airplane systems might generate a light, tone, or some other notice to alert airplane personnel of the turbulence alarms or updated turbulence maps.

The airplane systems could allow airplane personnel to select different views of the turbulence maps. One view could show a horizontal layer of turbulence at a selected elevation as viewed from above. For example, the view could show a national map of turbulence at the airplane's cruising altitude as viewed from above. Alternatively, the view could show a forward looking vertical slice of turbulence at a selected distance from the airplane. For example, the view could show a slice of the turbulence map that is 5 miles high and 5 miles wide, and that is located 100 miles in front of the airplane. Perspective 3D views of turbulence could be provided. Perspective, vertical, or horizontal views of turbulence could be provided in areas proximate to airports for use during takeoff and landing.

The above example distributes processing between the airplane systems, ground systems, and data center in a specific manner, but other processing distributions could be used in other examples. For example, the data center may offload some of the above processing from the airplane and ground systems.

Airplane System

Figure 2:
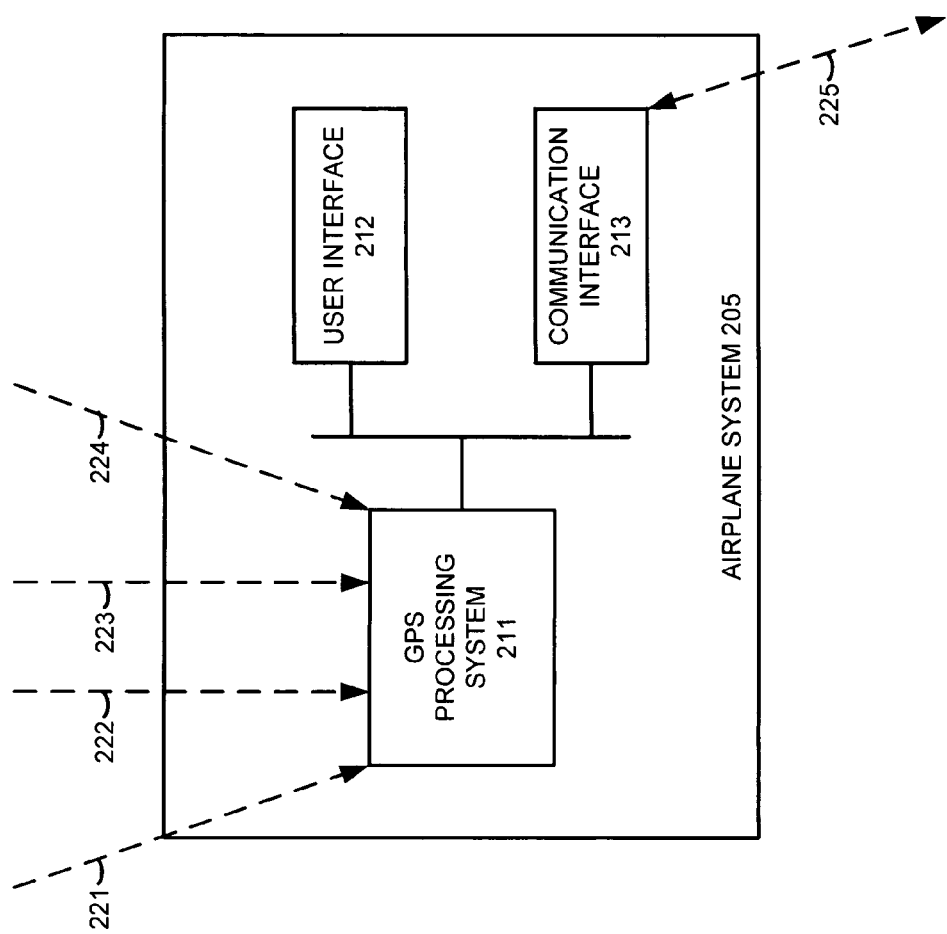
FIG. 2 illustrates an airplane system for a turbulence analysis system in an example of the invention.

FIG. 2 illustrates airplane system 205 for a turbulence analysis system in an example of the invention. For example, airplane system 205 could be located in airplane 105 in turbulence analysis system 100, although system 100 could also use alternative versions of system 205. Airplane system 205 includes GPS processing system 211, user interface 212, and communication interface 213. GPS processing system 211 is linked to user interface 212 and communication interface 213.

GPS processing system 211 includes a GPS receiver having dual L1 and L2 receivers to remove GPS signal delay due to the ionosphere. GPS processing system 211 includes a high-frequency filter to remove noise from GPS signals. GPS processing system 211 includes a computer microprocessor, logic circuit, or some other data processing device. GPS processing system 211 includes a memory that stores software or other machine-readable processing instructions. GPS processing system 211 retrieves and executes the software or instructions to control its operation. GPS processing system 211 may be distributed among multiple receiver, processing, and memory devices.

GPS processing system 211 receives GPS satellite signals 221-224. As noted, the number of satellites has been restricted for clarity, and GPS processing system 211 may receive GPS signals from more than four satellites. GPS processing system 211 processes GPS signals 221-224 to correct its internal time-of-day clock. GPS processing system 211 processes GPS signals 221-224 to determine the current location of airplane system 205. GPS processing system 211 processes GPS signals 221-224 to determine the time variance metrics for GPS signals 221-224. GPS processing system 211 periodically transfers data to communication interface 213. The data indicates the identity and approximate location of airplane system 205, the approximate time, and the time variance metrics identified with their satellites. The satellite identities could comprise the PRN codes in GPS signals 221-224.

Communication interface 213 could comprise an interface to an airplane communication system, a wireless transceiver, or some other communication device. Communication interface 213 may be distributed among multiple communication devices. Communication interface 213 receives the data from GPS processing system 211 and transfers a corresponding data signal over communication link 225 to a data center. The data signal indicates the identity and approximate location of airplane system 205, the approximate time, and the time variance metrics identified with their satellites.

Communication interface 213 receives turbulence maps and alarms from the data center over communication link 225. Communication interface 213 transfers the turbulence maps and alarms to GPS processing system 211. GPS processing system 211 transfers the turbulence maps and alarms to user interface 212. User interface 212 could comprise a keyboard, mouse, voice recognition interface, microphone and speakers, graphical display, touch screen, or some other type of user device. User interface 212 may be distributed among multiple user devices. User interface 212 receives and displays the turbulence maps and alarms as directed by GPS processing system 211. User interface 212 also receives user instructions to control the display of the turbulence maps and alarms. User interface 212 transfers the user instructions to GPS processing system 211. GPS processing system 211 processes the user instructions to control the views of the turbulence maps and alarms that are displayed to the user.

Ground System

Figure 3:
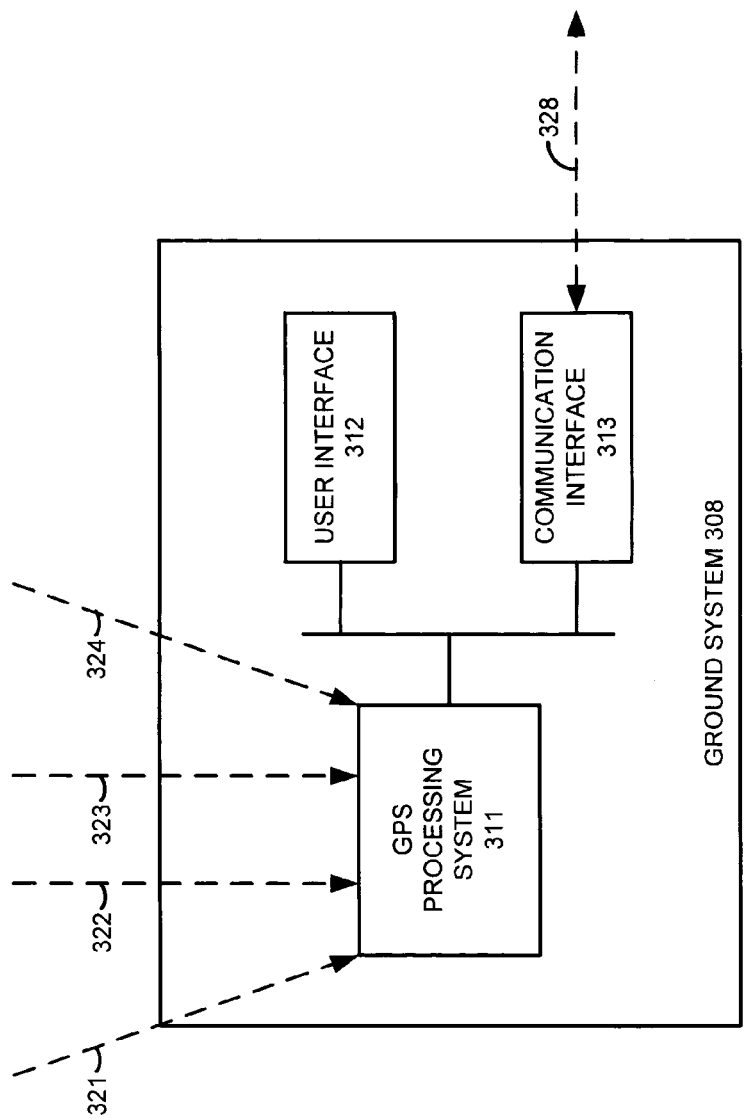
FIG. 3 illustrates a ground system for a turbulence analysis system in an example of the invention.

FIG. 3 illustrates ground system 308 for a turbulence analysis system in an example of the invention. For example, ground system 308 could be used for ground system 108 in turbulence analysis system 100, although system 100 could also use alternative versions of ground system 308. Ground system 308 includes GPS processing system 311 and communication interface 313. GPS processing system 311 is linked to communication interface 313.

GPS processing system 311 includes a GPS receiver having dual L1 and L2 receivers to remove GPS signal delay due to the ionosphere. GPS processing system 311 includes a high-frequency filter to remove noise from GPS signals. GPS processing system 311 includes a computer microprocessor, logic circuit, or some other data processing device. GPS processing system 311 includes a memory that stores software or other machine-readable processing instructions. GPS processing system 311 retrieves and executes the software or instructions to control its operation. GPS processing system 311 may be distributed among multiple receiver, processing, and memory devices.

GPS processing system 311 receives GPS satellite signals 321-324. As noted, the number of satellites has been restricted for clarity, and GPS processing system 311 may receive GPS signals from more than four satellites. GPS processing system 311 processes GPS signals 321-324 to correct its internal time-of-day clock. GPS processing system 311 processes GPS signals 321-324 to determine the individual time variance metrics for GPS signals 321-324. GPS processing system 311 periodically transfers data to communication interface 313. The data indicates the identity of ground system 308, the approximate time, and the time variance metrics identified with their satellites. The satellite identities could comprise the PRN codes in GPS signals 321-324.

Communication interface 313 could comprise a wireless transceiver, Internet interface, or some other communication device. Communication interface 313 may be distributed among multiple communication devices. Communication interface 313 receives the data from GPS processing system 311 and transfers a corresponding data signal over communication link 328 to a data center. The data signal indicates the identity of ground system 308, the approximate time, and the time variance metrics identified with their satellites.

If desired, ground system 308 could also provide turbulence maps and alarms. For example, ground system 308 could be located at an airport, and airport personnel may desire to access turbulence maps and alarms. In this scenario, ground system 308 would also include user interface 312 that is linked to GPS processing system 311. User interface 313 could comprise a keyboard, mouse, voice recognition interface, microphone and speakers, graphical display, touch screen, or some other type of user device. User interface 313 may be distributed among multiple user devices.

In this scenario, communication interface 313 receives the turbulence maps and alarms from the data center over communication link 328, and transfers the turbulence maps and alarms to GPS processing system 311. GPS processing system 311 receives the turbulence maps and alarms from communication interface 313. GPS processing system 311 transfers the turbulence maps and alarms to user interface 313. User interface 313 receives and displays the turbulence maps and alarms as directed by GPS processing system 311. User interface 313 receives user instructions to control the display of the turbulence maps and alarms and transfers the user instructions to GPS processing system 311. GPS processing system 311 receives the user instructions from user interface 312. GPS processing system 311 processes the user instructions to control the views of the turbulence maps and alarms that are displayed to the user.

Data Center

Figure 4:
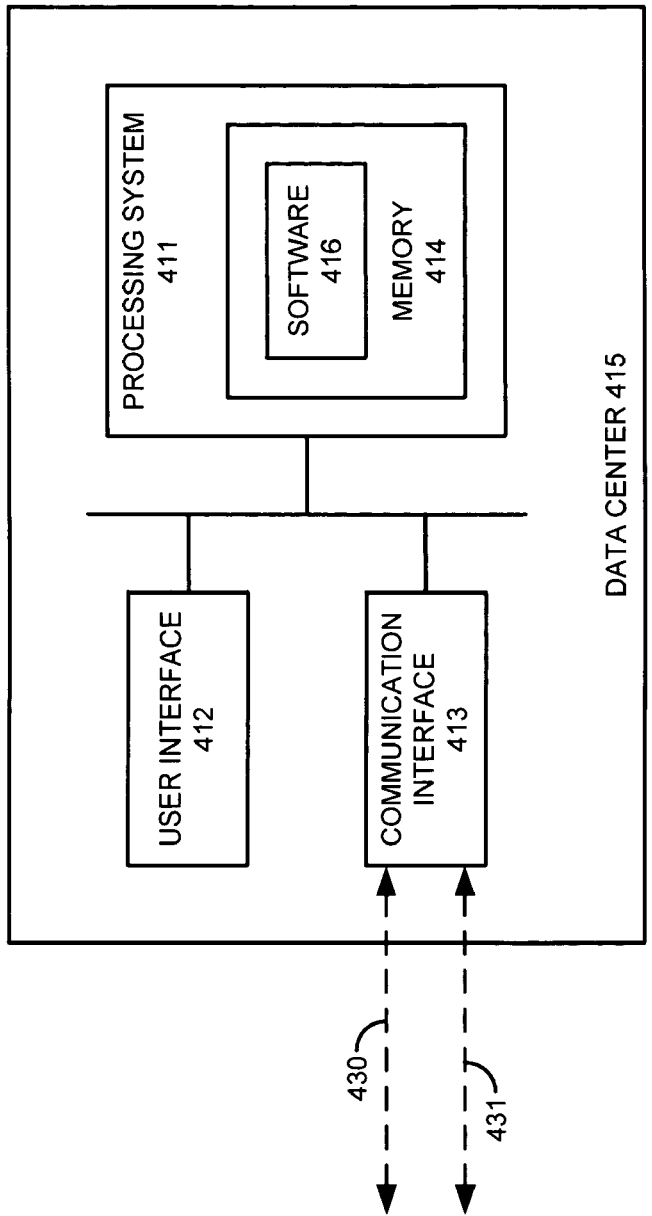
FIG. 4 illustrates a data system for a turbulence analysis system in an example of the invention.

FIG. 4 illustrates data center 415 for a turbulence analysis system in an example of the invention. For example, data center 415 could be used for data center 115 in turbulence analysis system 100, although system 100 could also use alternative versions of data center 415. Data center 415 includes processing system 411, user interface 412, and communication interface 413. Processing system 411 is linked to user interface 412 and communication interface 413.

Processing system 411 includes computer microprocessors, logic circuitry, or some other data processing devices. Processing system 411 may be distributed among multiple processing and memory devices. Processing system 411 includes memory 414 that stores software 416. Processing system 411 retrieves and executes software 416 to control the operation of data center 415. User interface 412 could comprise a keyboard, mouse, voice recognition interface, microphone and speakers, graphical display, touch screen, or some other type of user device. User interface 412 may be distributed among multiple user devices. Communication interface 413 could comprise an Internet interface, wireless transceiver, or some other communication device. Communication interface 413 may be distributed among multiple communication devices.

Communication interface 413 periodically receives data signals from airplane systems and ground systems over communication links 430. The data signals from an airplane system indicate the identity and approximate location of the airplane system, the approximate time, and the time variance metrics identified with their satellites. The data signals from a ground system indicate the identity of the ground system, the approximate time, and the time variance metrics identified with their satellites. Communication interface 413 transfers data from the data signals to processing system 411.

Processing system 411 processes the data (and other data) to determine position metrics for the satellite signals. The position metrics correspond to the geometric signal paths in a three-dimensional (3D) area for the individual satellite signals. The 3D area covers a surface area of interest, such as the United States or a region of the United States. The 3D area extends from the ground to an elevation of interest, such as 12 kilometers (km). The 3D area could use other surface areas and elevations. The 3D area may have various resolutions. For example the 3D area may be comprised of 3D boxes that are 10-100 km wide, 10-100 km deep, and ½ km high, although other resolutions could be used.

Processing system 411 processes the position metrics and the time variance metrics for the satellite signals to allocate atmospheric turbulence values to the three-dimensional area. Processing system 411 transfers an atmospheric turbulence map indicating the atmospheric turbulence values in the three dimensional area to communication interface 413. For example, the turbulence map could be comprised of 3D boxes that are each labeled with no, light, moderate, or severe turbulence.

Communication interface 413 transfers the turbulence map or portions of the turbulence map to airplane systems and ground systems over communication links 430. Communication interface 413 transfers the turbulence map or portions of the turbulence map to other systems over communication links 431. Data center 415 would periodically repeat the above process. For example, data center 415 might produce a new turbulence map every few minutes, every 5-10 minutes, every 30 minutes, every hour, or at some other time interval.

In some examples, processing system 411 obtains the flight plan for an airplane. Processing system 411 may receive the flight plan from the airplane over communication links 430-431. Processing system 411 may determine the flight plan based on the airplane location supplied by the airplane system. Processing system 411 may retrieve the flight plan from an airline database. Processing system 411 compares the flight plan to the turbulence map to determine if the flight plan will traverse areas of turbulence. If the flight plan will traverse an area of turbulence, processing system 411 generates and transfers a turbulence alarm to communication interface 413. Communication-interface 413 transfers the turbulence alarm to the affected airplane over communication links 430-431. Processing system 411 could also determine alternative flight plans that avoid the areas of turbulence and indicate the alternative flight plans along with the turbulence alarm.

Time Variance Metrics

Figure 5:
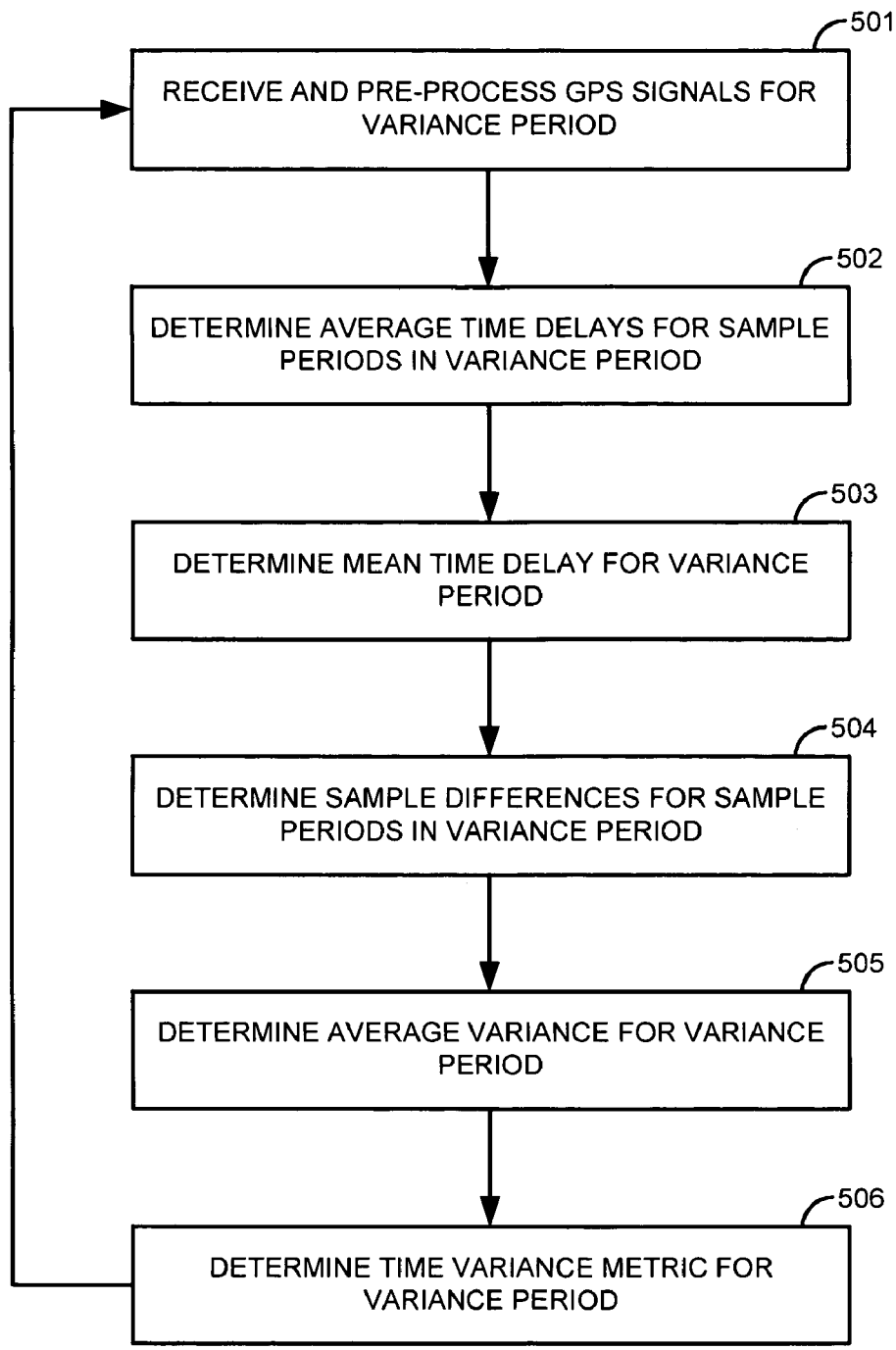
FIG. 5 illustrates time variance determination in a turbulence analysis system in an example of the invention.

FIG. 5 illustrates a process to determine time variance metrics in a turbulence analysis system in an example of the invention. For example, turbulence analysis system 100 or airplane system 205 could use the following process, although systems 100 and 205 could also use alternative versions of this process. The reference numbers on FIG. 5 are indicated parenthetically below.

The process starts by receiving and pre-processing GPS signals from GPS satellites for a variance period (501). Pre-processing includes filtering the GPS signals to remove unwanted noise and correlation to correct a local time-of-day clock. It may be desirable to remove data for some unwanted GPS signals before time variance metrics are determined. For example, turbulence data for GPS signals that have a horizontal angle of less than six degrees (signals that are nearly horizontal to the ground) may be discarded.

In this process, a variance period is a time period that includes a series of sample periods. The variance period could be 1-10 minutes in length, and the sample periods could each be 1-10 seconds in length. The average time delay for each sample period in the variance period is determined (502). A time delay is GPS signal transfer time—the difference between the time of GPS signal transmission (the time indicated in the GPS signal) and the time of GPS signal reception (the current time). The average time delay is the sum of the time delays in the sample period divided by the number of time delays in the sample period.

The mean time delay for the variance period is determined (503). The mean time delay is the sum of the average time delays divided by the number of the average time delays in the variance period.

The sample difference for each sample period in the variance period is determined (504). The sample difference is the difference between the average time delay for the sample period and the mean time delay for the variance period.

The average variance for the variance period is determined (505). The average variance is the sum of the squares of the sample differences divided by the number of sample differences in the variance period.

The time variance metric for the variance period is determined (506). Ranges of average variances are established where each range has an associated time variance metric. For example, there could be four ranges of average variances that respectively correspond to four time variance metrics: 0, 4, 6, and 8. The average variance for the variance period is allocated to the proper range to yield the corresponding time variance metric.

The process then repeats for the next variance period (501).

Note that in this example the time variance metric is the result a specific mathematical operation. In alternative examples, the time variance metric could be the result of a different mathematical operation where the time variance metric corresponds to the variance in the signal transfer time for a satellite signal.

Turbulence Map

Figure 6:
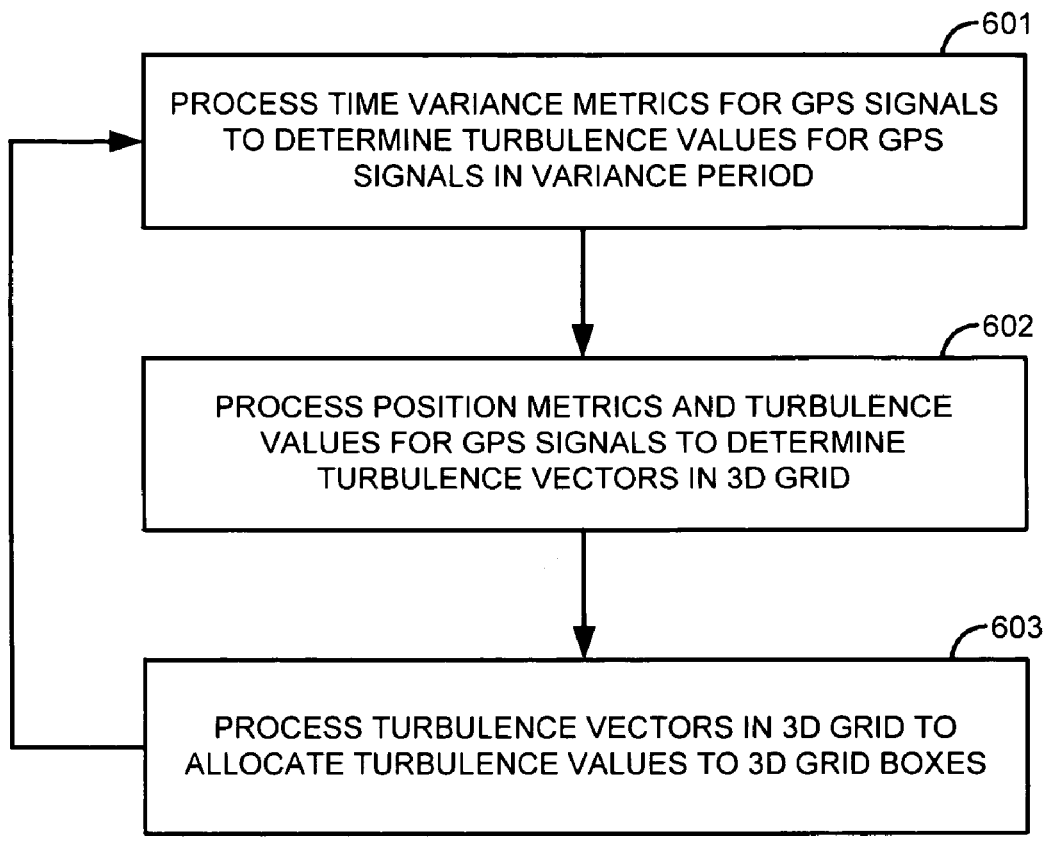
FIG. 6 illustrates turbulence map determination in a turbulence analysis system in an example of the invention.

FIG. 6 illustrates a process to generate a turbulence map in a turbulence analysis system in an example of the invention. For example, turbulence analysis system 100 or data center 415 could use the following process, although system 100 and center 415 could also use alternative versions of this process.

The process begins by processing the time variance metrics for the variance period to produce corresponding turbulence values for individual GPS signals (601). The processing could include scaling the time variance metrics. For example, time variance metrics of 0 could be scaled to yield a turbulence value of 0.001, and time variance metrics of 4, 6, and 8 are multiplied by 15 to yield respective turbulence values of 60, 90, and 120. A turbulence value of 0.001 indicates no turbulence, and turbulence values of 60, 90, and 120 indicate light, moderate, and severe turbulence respectively.

Position metrics and turbulence values for individual GPS signals are processed to determine a turbulence vector for each GPS signal (602). The turbulence vector for a GPS signal is positioned in a 3D grid between the location of the transmitting satellite and the location of the receiving airplane or ground system. For each GPS signal, the location of the satellite identified in the data signals at the time indicated in the data signals is retrieved from a satellite database. If the GPS signal is received by an airplane, the location of the airplane is retrieved from the data signals. If the GPS signal is received by ground system, the location of the ground system identified in the data signals is retrieved from a ground system database. The turbulence vector for the GPS signal has the turbulence value derived from the time variance metric for the GPS signal.

It may be desirable to remove some unwanted turbulence vectors before generating the turbulence map. For example, turbulence vectors that do not transit to the top of the 3D grid may be discarded. Turbulence vectors that have an angle to the ground of less than six degrees (vectors that are nearly horizontal to the ground) may also be discarded.

The turbulence vectors for the GPS signals are processed to generate a 3D turbulence map (603). The turbulence map is a 3D grid comprised of 3D boxes that each have an assigned turbulence value. To generate the turbulence map, the turbulence value from each turbulence vector is allocated to one or more of the 3D grid boxes that the turbulence vector traverses. The resulting 3D turbulence map indicates turbulence as none, light, moderate, and severe. The process then repeats for the next variance period (601).

There are various known techniques for allocating vector values from vectors in a 3D grid to the boxes in the 3D grid. A preferred technique is the Singular Value Decomposition (SVD) algorithm. Another technique is the Broyden-Fletcher-Goldfarb-Shanno (BFGS) algorithm. The SVD and BFGS algorithms are described in *Numerical Recipes*; W. H. Press, B. P. Flannery, S. A. Teukolsky, and W. T. Vetterling; Cambridge University Press (1996).

A proper allocation of turbulence values from the turbulence vectors to the 3D grid is related to the resolution of the grid (number of grid boxes) and the number of GPS signals. The resolution of the grid should be granular enough so that the turbulence map is a helpful tool for pilots and airports. The number of GPS signals should be more than the number of 3D grid boxes. For example, it may be desirable to have 1.1-1.6 times more GPS signals than grid boxes. If the number of GPS signals is limited, the resolution of the grid can be changed to achieve the desired ratio between signals and grid boxes.

Additional Description

This section further describes various aspects of turbulence analysis, although these aspects are not required in all examples of the invention. The use of the Global Positioning System (GPS) for navigation and environmental monitoring is well documented. Changes in the index of refraction or refractivity as the GPS signal passes through the atmosphere are a function of the temperature and water vapor content along the GPS ray path. Most meteorological applications of GPS technology seek to separate the temperature and water vapor effects. Here, the goal is not to separate the two, but simply to measure their combined effect on a suitably small temporal scale, and then analyze the variance of the signal about that mean value as a measure of the intensity of the high frequency turbulence about that temporal scale.

The turbulence analysis system uniquely uses the GPS system with receivers on the ground and on commercial aircraft to obtain a national map of turbulence areas in the middle to upper atmosphere. Such a product would make a significant contribution to the safety of our National Airspace System (NAS). The approach outlined is relatively inexpensive. The turbulence analysis system may include the GPS receiver hardware and software on ground stations and on commercial aircraft, the communication of the turbulence information from those sources to a Turbulence Processing Center, and the unique communication of the national product to a variety of users. The end result of the complete system is a national map showing layers containing turbulence of three different levels of intensity which is provided every hour across the United States (or over any air space) and subsequent tailored visuals to those who benefit from the information.

The GPS receivers can be new special receivers for the turbulence purpose or they can be existing GPS receivers that serve other navigational purposes and which have also been updated with hardware and software to serve the special GPS turbulence application. The GPS receiver for the turbulence application performs location in 3-dimensions as is customary but also will: (1) calculate the turbulence metric and (2) remove errors that could affect the turbulence data authenticity.

Data from airplane systems may be more desirable than data from ground systems. The GPS signals received by airborne airplane systems flying above the boundary layer are not affected by the boundary layer at the earth's surface. Note that if a ground system is properly placed near an airport runway, then landing airplanes will pass over the ground system just above the boundary layer. If the landing airplane has an airplane system, then the effects of the boundary layer on turbulence determination may be determined. The processing of satellite signals received by ground stations could be modified to account for these boundary layer effects.

The variance data about the geophysical mean signal (the neutral atmosphere excess delay due to temperature and water vapor) will be computed by the GPS receiver. This variance value for each GPS slant path will be processed by the GPS receiver software. Only those variance values from rays with elevation angles greater than 6 degrees will be transmitted to the ground. This eliminates multipath effects.

The delays will be processed by averaging over a Y-minute variance period of data for each ray path. The range value of Y will be determined by extensive calibration. This mean value of the excess delay is not used. It is the variance of the data (each ray's filtered delay over the much shorter X-second sample time period—differenced from the mean delay over Y-minutes, and then squared and averaged) that indicates the turbulence strength. X could vary from 1 to 10 seconds and Y could vary from 1 to 10 minutes. Thus, the time period of Y is about 60 times the period of X. There may be required a high frequency noise filter before the X-second data is captured.

Proper calibration of these variance values to produce an authentic turbulence metric is the key to an accurate product. The averaging times for Y and X must be such that: (1) atmospheric turbulence is captured and (2) insignificant noise is ignored. For illustration purposes, consider that the variance for a vertical ray varies from 0 to 10 for turbulence from a single layer. The GPS receiver would send a zero (no turbulence) for variance values less than 3, a value of 4 for light turbulence for variance values ranging from 3 to less than 5.5, a value of 6 for moderate turbulence for variance values 5.5 to less than 8, and a value of 8 for severe turbulence for variance values of 8 or greater. The cases where there are multiple layers of turbulence and slant paths are discussed later.

The GPS receiver will be duel frequency (measuring both L1 and L2) to remove the ionosphere delay. Ionosphere turbulence is negligible compared to troposphere turbulence. The receiver clock error (the largest source of error because of the quality of the clocks compared to the larger and more accurate satellite clocks) is removed by the software with the reception of four or more satellite signals simultaneously.

The aircraft GPS receivers are more valuable than the ground stations receivers because they see data above the atmospheric boundary layer. However, the ground receivers can still be valuable as the difference between the measured variance (aircraft versus ground station)—one located just above the boundary layer in the same line of sight ray path as the other) can help quantify the boundary layer effect on turbulence intensity.

The data to be transmitted from ground stations to the Turbulence Processing Center (TPC) includes the station ID number, the variance value for each slant path ray for that epoch (the Y-minute time interval), and the time at the center of the Y-minute time interval. The variance value for each slant path will be for that particular ray to each GPS satellite (identified by its Pseudo Random Noise [PRN] code).

This record can be sent every Y minutes or several records can be concatenated together and sent as a single transmission to the TPC. The turbulence product map period is the period over which the product is valid and represents the frequency with which the product is produced. This could be every on half hour or every hour. Thus, there could be 12 (5-minute Y records) or 6 (10-minute Y records) that go into an hourly map period product. Similarly, there could be 6 (5-minute Y records) that go into a half hour map period product.

The station ID number is identified in a library so that the latitude, longitude and elevation above sea level are available within the computers at the TPC. The TPC will also have the current satellite locations and will be able to reconstruct the actual slant path geometrically over a national grid—so that the final computation for the turbulence grid can be obtained. In summary, a ground station sends only its ID, time, each GPS satellite ID in view, and the variance value (for each slant path ray to the satellite in view) with each record.

The transmission of data from the commercial aircraft can proceed by the most cost effective means. For aircraft within range of the VFH or HF ACARS real time communication system, the data will be transmitted in a specially designed format to minimize transmission costs. For aircraft over the oceans or out of the range of an ACARS VHF station, the transmission can be via one of several satellite communication systems available. The transmission from the aircraft must include the aircraft ID (this can be a pseudo-ID, not necessarily the actual tail number). Also included with the message will be time (at the center of the Y-minute epoch) latitude, longitude, and pressure altitude of the aircraft (at the time of the center of the epoch). Finally, the record will contain the variance values for each slant path ray to each GPS satellite (identified by its Pseudo Random Noise [PRN] code). The TPC will have the current satellite locations and (along with the information provided by the aircraft on its location) will be able to reconstruct the actual slant path geometrically over the national grid.

Before addressing the primary function of the TPC, the production of a national turbulence map based upon the variance vales from individual ray paths, there is a subtle point to consider. The use of "slant path water vapor" (the integrated amount of precipitable water along the path from an individual GPS satellite to a GPS receiver) has been advocated as having the potential to help reconstruct the three dimensional water vapor field. This is a mathematical optimization problem (also referred to as a minimization problem) working with continuous data. The method involves integrating along the ray paths. If there are enough rays, the SVD algorithm will mathematically converge to the proper answer.

In this problem, with a continuous field of water vapor, the GPS signal delay increases proportionately to the amount of water vapor present. The delay is additive as one integrates over the ray path. Consider a single layer of turbulence high in the atmosphere that produces a variance in the signal received at the ground due to the scatter associated with the turbulence in the source region. If there is no further turbulence below that single layer, then the variance is unchanged as the signal passes through multiple layers with no turbulence. What if another layer of turbulence (below the original turbulence source) is encountered by the signal? Will the variance associated with both levels be additive? There is evidence from theory that the scatter will increase as the GPS rays encounter another layer of turbulence, but the variance increase may not be exactly numerically additive.

Here in the demonstration of the method it is assumed that the variance associated with each turbulent layer is additive. This assumption can be modified by latter calibration confirmation and the same methodology as described below will apply. For example, the integrated sum may only add to a fraction of the total as a function of elevation angle. As long as the same functional relationship is applied throughout for each ray, the results will be the same.

One may view the computation of the turbulence values over an array of grid points as utilizing vectors (with a direction and a magnitude) and solving the basic equation

AX=B;

where A is a matrix (defined below), X is a vector of the unknown grid point turbulence values, and B is a vector made up of all the rays (each ray also thought of as a vector). Consider each of these in reverse order.

The rays have a direction and a magnitude. The magnitude is the signal variance generated by each GPS receiver (whether it is in a permanent location on the ground or in a mobile commercial aircraft). The atmosphere domain over which turbulence is to be depicted is represented by a three dimension array of grid points. The grid points are hypothetical points fixed in space. The position of the grid points does not change over time, but their values change over time as the turbulence moves, intensifies or dissipates. The rays pass very close to a few of these grid points as they extend through the atmosphere. The closeness can be quantified by interpolation in three dimensions. The ray path is interpolated to the nearest three dimensional grid points at intervals along the path. Thus, there may be more than one interpolation value for a particular grid point. Consider that the number of grid point is N. Thus the "unknowns" of the problem are the X grid point values to be determined of which there are N of them.

The matrix of values depicted by the matrix A represents the sum of the interpolated values for each ray for each possible grid point value. Thus A is a two dimensional array of known numbers (interpolated values which change at each map time because the satellites move and the aircraft move). A is an array of (# of rays, # of grid points)—each ray for each grid point. Thus, there are R×N elements (numbers) in the array A. This A matrix starts out as being quite sparse (containing many zeros) as a given ray may only affect a few of the grid points, and the array starts out with all zeroes. However as all the rays from all sources are included, the array becomes less and less sparse. Note that many rays will see no turbulence and these contribute to the final answer as well.

In term of the equation above we can now write each matrix in terms of the number of rows and number of columns:

AX=B;

$(R \times N)(N \times 1) = (R \times 1);$      Equation (1)

which is in the proper form (proper number of rows and columns) for matrix multiplication. The solution of equation (1) may or may not be possible. If the number of unknowns (N) is greater than the number of knowns (R)—more grid points than rays available then there is no unique solution to equation (1).

On the other hand, if there are more equations [knowns (R)] than unknowns (N)—more rays available than grid points, then the problem represented by equation (1) is overdetermined and there may or may not be a solution. The reason an overdetermined problem may not have a solution is that the matrix A may be singular or the matrix may be close to singular and a combination of close rays and slight errors in the data could lead to a totally wrong solution. There is, however, a powerful method of solving such equations as (1) when they are overdetermined. This is the method of singular value decomposition (SVD). SVD produces a solution that is a best approximation in the least squared sense.

In the real world of producing the turbulence product, the rays provide the variance values (B) where there are R rays. The algorithm and software produce the matrix A by incrementing along each ray path (upward from the ray source at the receiver) and produce the interpolated values for each grid point close to the ray path. The solution for the grid values (X), of which there are always N of them, is carried out by SVD for each turbulence map period (e.g. every hour or less as desired—but consistent with the number of rays being greater than the number of grid points for each map period).

There must be sufficiently more ray than grid points. Note that the variance values obtained from the GPS receivers may or may not be rescaled in value by the Turbulence Processing Center (TPC) for computational convenience. However, for ease in identifying the different turbulence intensity regions over the grid, the turbulence variance values may be as rescaled as follows: if the ray variance value is zero it is converted to a small number as 0.001. All other non-zero values are multiplied by 15. Thus, for example, the turbulence values from a single layer and from a vertical ray, the variance values are 4, 6, and 8 for light, moderate, and severe turbulence, respectively. After the resealing by the TPC these values will be 60, 90, and 120, respectively.

One may ask the question "How does the method distinguish between multiple layers? Note that turbulence is usually confined to a few thin layers. The following computations use atmospheric layers of 0.5 km thick. It is expected that usually the turbulence in the vertical will be confined to a single 0.5 km layer up to layers of a few kilometers. It really does not matter if (1) the turbulence is additive (if not, handle that through calibration) and (2) there are a sufficient numbers of rays.

Consider the following example Consider two cases of vertical rays (the same applies to slant path rays, but let us keep the numbers simple). One case is a rescaled ray of variance value 120 which really is a single severe layer. The other case is a rescaled ray of variance value 120 which really is two layers of light turbulence (60 each). The sufficient number of rays passing through the grid will determine if the turbulence is in one layer or two. For example, if the real case is severe in one layer, then one or more rays passing through the non-turbulent layer will encounter only integrated values of 0.001 in each layer (which will total 0.025 if there are 25 layers (surface layer plus 24 layers of 0.5 km depth for a top of the aircraft atmosphere of 12 km) and the ray is vertical. The integrated value could perhaps be as large as 0.20514 if the ray has an elevation angle of only 7 degrees–the integrated path is then top/sine of elevation angle=0.025/sine 7 degrees=0.025/0.12187=0.20514. Whereas the rays that encounter the severe layer will see some part of the value 120 if they only pass through part of the layer, the value of 120 if they pass vertically through the layer, and larger values than 120 if the path is completely through the layer and passing at an angle.

In this case if the actual situation was two layers of light turbulence, then the entire ensemble of rays will determine this and each layer will converge to the exact value of 60. This is the power of the BFGS algorithm for optimization and the power of the SVD method—if there are sufficient rays.

The above discussion indicated that there must be more rays (R) than grid points (N). Consider the following example where for convenience we split the 3-D grid point field into the (# of horizontal grid points)×(# of vertical layers). The number of vertical layers is not likely to change. Then define:

N=# of grid points;
R=# of rays;
NS=# of ground stations with GPS receivers per horizontal grid point;
NA=# of aircraft with GPS receivers per horizontal grid point;

AS=average # of satellites in view at any instant

MR=ratio of Map period (minutes) to Y averaging time period (minutes)

NVL=number of vertical levels.

The ratio R/N=(NS+NA) (AS) (MR)/NVL.

If NS=0.25, NA=0.75, AS=8, MR=(30-minute map/6 minute Y)=5 and

If NVL=25 (0.5 km vertical resolution from surface to 12 km);

$$R/N=(0.25+0.75)(8)(5)/NVL=40/NVL=40/25=1.6$$

This is a possible and realistic scenario.

Another case with far fewer aircraft available and slightly less ground stations might have NA=0.20, NS=0.20 and a 60-minute map product with:

$$R/N=(0.20+0.20)\ (8)\ (60\text{-minute map}/5\text{-minute}\\Y)/25=(0.4)\ (8)\ (12)/(25)=1.54$$

There is an example of a complicated case where the ratio R/N was 1.16 and the accuracy for the turbulence grid values was more than sufficient. The ratio of R/N must be greater than one in the real world for several reasons. Values of R/N=1.1 or greater should be maintained.

The rays are set to the average time of the Y averaging period. The satellite positions may not be precise. The map period contains results from different Y-epochs where the turbulence may have slightly changed and the satellites and aircraft have moved. Mere round off error in the SVD method occurs. The SVD method itself in providing the best solution as an approximation in the least squared error sense, Thus, for all of the above reasons and more, the ratio must be greater than one. The use of the Singular Value Decomposition (SVD) approach appears to be considerably faster than the Broyden-Fletcher-Goldfarb-Shanno (BFGS) optimization algorithm or the BFGS algorithm with a learning algorithm for iterative improvement. The use of the Singular Value Decomposition (SVD) approach also appears to reduce complexity.

By rescaling the variance values at the TPC and by setting the initial grid values to 0.001, the final answers (though ragged to a percent or so) easily reveal the various layers of turbulence with their proper intensity. Earlier work using GPS signals and relating them to turbulence has indicated a connection, but not an explicit relationship. This system assigns a turbulence intensity value to GPS receiver variability.

If there is an area on the turbulence map with incomplete turbulence data, then the data center could send a turbulence query to an airplane in that area. The pilot on the airplane could respond with a turbulences report (such as none, light, moderate, and severe turbulence) and the pilot's report could be used to complete the turbulence map.

Having GPS receivers near both ends of active airport runways (at a point where the aircraft is typically above the atmospheric boundary layer) will provide two very closely spaced GPS slant paths—one will emanate from the surface station within the atmospheric boundary layer, and the other slant path will be from the aircraft above the boundary layer. The gathering of such closely spaced slant path rays in all weather conditions, at various times of the day and at various seasons, will indicate the affect of the boundary layer on the magnitude of the variance values.

The effect of thunderstorms on the turbulence metrics produced by airplane and ground systems may be analyzed as the thunderstorms pass to determine the effects of the thunderstorms on turbulence metric determination. For example, thunderstorms generate gravity waves, and the effect of these waves on the time variance metrics could be determined and corrected.

Existing and future data from GPS receivers that have slant path rays through or near thunderstorms can be used to aid the calibration process. The relationship of the slant path rays to the thunderstorm position could be (i) passing directly through the thunderstorm cell, (ii) passing above the radar echo of the cell, or (iii) passing very near to either side of the cell. The thunderstorm is always avoided by commercial pilots in carrying out their safety responsibilities because of the turbulence associated with thunderstorms. Rays passing through the radar echo of a thunderstorm will provide a metric of their average effect on the ray variance. Rays passing near the echo and, especially just above it, will provide a metric of the average intensity of turbulence due to propagating gravity waves away from the storm.

Further calibration of existing slant path data or the calibration of new data gathered for this purpose, will be valuable in determining the minimum noise variance level when conditions are calm. There are a number of tasks related to quality control and assuring a quality product on a 24/7 basis. One task to be performed is to assure that all rays exit the top of the grid-otherwise the information they convey is partially from outside the grid domain, and to apportion that information to grid values inside the domain is wrong.

Another task at night, when there are fewer commercial aircraft flying, is to make the horizontal grid more sparse (fewer grid points). For example, if the resolution of the horizontal grid is halved in both directions, then 4 times fewer aircraft and ground stations are required to make the same R/N ratio. Another possible approach to speeding up the calculations (if needed) is to use multiple computers (back up machines are required in any event for continuous operations) and independently work on portions of the full domain in parallel.

The immediate task of the TPC after the analysis of the atmospheric turbulence has been completed is to format and disseminate the special output products to the various users. One simply formatted message will go to aircraft whose flight path takes them close to an existing turbulence area. A second set of messages will contain a map of the turbulence areas within the national air space (NAS) being analyzed—this will go to the Air Traffic Control (ATC) authorities concerned for their respective regions and to other governmental and non-governmental agencies with a need to know.

The TPC will issue a Turbulence Warning Message when an aircraft's projected flight path would take it close to an identified rectangular turbulence area. This uplinked message would contain the latitude, longitude, and altitude of the center of the rectangle. The message would further have 4 bytes of information containing the x-length, y-length, and z-thickness, and intensity of the turbulent rectangle, respectively. An on board ACARS display devise would locate the area on the projected flight path for the pilot. The three lengths would be in kilometers and the intensity would be a character from 1 to 3 for the levels of intensity from light to moderate to severe.

The TPC would also be able to send a Turbulence Status Message to selected aircraft projected to be close to an area of questionable turbulence. The message would locate the rectangular area as above. The pilot participating in the program would send back a simple Yes or No answer. This kind of feedback would help with grid boxes with too few rays and perhaps questionable data.

Other on-going tasks include additional calibration efforts to continue to improve the products, product verification, and statistical evaluation for quality control purposes. Some of these are indicated below. The TPC will archive outlier reports received from GPS receivers (when and if they occur). Systematic evaluation of these will help identify hardware and software errors in GPS receivers.

Because the processing algorithm can keep track of the number of rays affecting any given grid box, any suspect turbulence box (e.g., only hit by one ray) not continuous for two or more 20-minute map periods, might be an inappropriate turbulence box—perhaps a receiver has gone bad. Statistics automatically computed like this can provide continuous help in improving the product over time. These and other quality control measures will maintain a quality turbulence product suite.

The measured variance can be discretely set for three levels of turbulence intensity (light, moderate and severe) by the values (4, 6, and 8). These values are for a single layer of turbulence and a vertical ray. The lowest level of variance for the light intensity is scaled high enough to eliminate remaining noise, any remaining natural variability that is not turbulence, and very light intensity turbulence. The rescaled values performed at the TPC set the zero (no turbulence) variance value to 0.001 and all other values are multiplied by 15. The single layer, vertical ray values of intensity (4, 6, and 8) become (60, 90 and 120).

The "turbulence" one feels in an aircraft is predominately mechanical turbulence or velocity turbulence. This is characterized by velocity gradients in the atmosphere. Whatever the cause or source of such turbulence, the disruption of the generally laminar layers of water vapor and the average vertical gradient of temperature will help in identifying the turbulent intensity. Above the planetary boundary layer, water vapor tends to align itself in horizontal layers with decreasing mixing ratio values as a function of height in quiescent or laminar flow regions. There may be only small amounts of water vapor in the upper troposphere, however, the refractivity (N) is greater for moist air than dry ([per mole] N is 17 times greater for water vapor than for dry air). Thus, the disruption of the laminar flow regime by the vertical velocity turbulence will be detected by the highly sensitive GPS signals.

The temperature in the upper troposphere also generally decreases as a function of height in the middle to upper troposphere in quiescent or laminar flow regions. When this is disrupted by the high frequency vertical velocity turbulence, the combination of water vapor and temperature heterogeneity will disturb the sensitive GPS signals—producing high frequency variability in the GPS signals—which will be captured by the analyzed variance data described earlier.

In some examples, velocity turbulence and its detection applies to the classic clear air turbulence (not larger scale convective turbulence). The GPS variance along the ray path must be calibrated to capture the light, but significant, clear air turbulence deemed important to the aviation industry for passenger comfort.

Convective turbulence, where there are large vertical and horizontal wind shears created and large scale updrafts and downdrafts, will produce GPS variance data able to identify the intensity of this form of turbulence from the usual quiescent and laminar conditions. The turbulence metric provides a measure of intensity, but only somewhere along the ray path. It is only through the acquisition of very many ray paths that the geographic location of the turbulence area can be determined. Even with the many paths, further unique processing characteristics are required to properly converge to the correct turbulent location areas in a timely fashion.

The invention claimed is:

1. A method of operating a turbulence analysis system comprising:
    determining position metrics for a plurality of satellite signals, wherein the position metrics correspond to geometric signal paths in a three-dimensional area for individual ones of the satellite signals;
    receiving time variance metrics for the satellite signals, wherein the time variance metrics correspond to variances in signal transfer times for the individual ones of the satellite signals;
    processing the position metrics and the time variance metrics for the satellite signals to allocate atmospheric turbulence values to the three-dimensional area; and
    transferring an atmospheric turbulence map indicating the atmospheric turbulence values in the three dimensional area.

2. The method of claim 1 further comprising:
    receiving the satellite signals from the satellites
    processing the satellite signals to determine the time variance metrics for the satellite signals; and
    transferring the time variance metrics for the satellite signals.

3. The method of claim 2 wherein processing the satellite signals to determine the time variance metrics comprises:
    determining average signal transfer times during a plurality of sample periods;
    determining a mean signal transfer time during a variance period, wherein the variance period includes the sample periods; and
    determining differences between the average signal transfer times and the mean signal transfer time.

4. The method of claim 2 wherein receiving the satellite signals from the satellites comprises receiving a first set of the satellite signals in a plurality of airplanes, and wherein a first set of the position metrics indicate a first set of the geometric signal paths in the three-dimensional area between the satellites and the airplanes.

5. The method of claim 4 wherein receiving the satellite signals from the satellites comprises receiving a second set of the satellite signals in a plurality of ground systems, and wherein a second set of the position metrics indicate a second set of the geometric signal paths in the three-dimensional area between the satellites and the ground systems.

6. The method of claim 1 wherein processing the position metrics and the time variance metrics for the satellite signals to allocate the atmospheric turbulence values to the three-dimensional area comprises processing a singular value decomposition algorithm to allocate the atmospheric turbulence values to the three-dimensional area.

7. The method of claim 1 further comprising receiving and displaying at least a portion of the turbulence map in an airplane.

8. The method of claim 1 further comprising comparing a flight plan for an airplane to the turbulence map to determine if the flight plan will traverse atmospheric turbulence, and if the flight plan will traverse the atmospheric turbulence, generating a turbulence alarm.

9. The method of claim 8 further comprising determining an alternative flight plan for the airplane that will not traverse the atmospheric turbulence.

10. The method of claim 1 wherein the satellites comprise Global Positioning System (GPS) satellites and the satellite signals comprise GPS signals.

11. A turbulence analysis system comprising:
- a communication interface configured to receive time variance metrics for a plurality of satellite signals, wherein the time variance metrics correspond to variances in signal transfer times for individual ones of the satellite signals; and
- a processing system configured to determine position metrics for the individual ones of the satellite signals, wherein the position metrics correspond to geometric signal paths in a three-dimensional area for the individual ones of the satellite signals, and to process the position metrics and the time variance metrics for the satellite signals to allocate atmospheric turbulence values to the three-dimensional area to produce an atmospheric turbulence map indicating the atmospheric turbulence values in the three dimensional area; and
- the communication interface is further configured to transfer the atmospheric turbulence map.

12. The turbulence analysis system of claim 11 further comprising a plurality of airplane systems on airplanes and a plurality of ground systems configured to receive the satellite signals from the satellites, process the satellite signals to determine the time variance metrics for the satellite signals, and transfer the time variance metrics for the satellite signals.

13. The turbulence analysis system of claim 12 wherein the airplane systems and the ground systems are configured to determine the time variance metrics by determining average signal transfer times during a plurality of sample periods, determining a mean signal transfer time during a variance period, wherein the variance period includes the sample periods, and determining differences between the average signal transfer times and the mean signal transfer time.

14. The turbulence analysis system of claim 12 wherein a first set of the position metrics indicate a first set of the geometric signal paths in the three-dimensional area between the satellites and the airplanes.

15. The turbulence analysis system of claim 14 wherein a second set of the position metrics indicate a second set of the geometric signal paths in the three-dimensional area between the satellites and the ground systems.

16. The turbulence analysis system of claim 11 wherein the processing system is configured to process the position metrics and the time variance metrics for the satellite signals to allocate the atmospheric turbulence values to the three-dimensional area by processing a singular value decomposition algorithm to allocate the atmospheric turbulence values to the three-dimensional area.

17. The turbulence analysis system of claim 11 further comprising airplane systems on airplanes configured to receive and display at least a portion of the turbulence map on the airplanes.

18. The turbulence analysis system of claim 11 wherein the processing system is further configured to compare a flight plan for an airplane to the turbulence map to determine if the flight plan will traverse atmospheric turbulence, and if the flight plan will traverse the atmospheric turbulence, to generate a turbulence alarm, and wherein the communication interface is configured to transfer the turbulence alarm.

19. The turbulence analysis system of claim 18 wherein the processing system is further configured to determine an alternative flight plan for the airplane that will not traverse the atmospheric turbulence and wherein the communication interface is configured to transfer the alternative flight plan.

20. The turbulence analysis system of claim 11 wherein the satellites comprise Global Positioning System (GPS) satellites and the satellite signals comprise GPS signals.

* * * * *